United States Patent [19]
Tas

[11] Patent Number: 5,208,997
[45] Date of Patent: May 11, 1993

[54] APPARATUS FOR MEASURING THE THICKNESS OF FLOWER STEMS

[75] Inventor: Adrianus W. Tas, Nootdorp, Netherlands

[73] Assignee: Aweta B.V., Nootdorp, Netherlands

[21] Appl. No.: 824,209

[22] Filed: Jan. 22, 1992

[30] Foreign Application Priority Data

Jan. 22, 1991 [NL] Netherlands ......................... 9100099

[51] Int. Cl.[5] .......................... G01B 5/02; G01B 5/10
[52] U.S. Cl. ........................................ 33/783; 33/784
[58] Field of Search ................ 33/783, 807, 808, 734, 33/743, 747, 797, 798, 800, 711, 558.01, 558.2, 558.4, 555.1, 784, 501.04

[56] References Cited

U.S. PATENT DOCUMENTS

| | | | |
|---|---|---|---|
| 2,706,857 | 4/1955 | Carter | 33/747 |
| 2,885,787 | 5/1959 | Gray et al. | |
| 3,205,585 | 9/1965 | Beatty | 33/501.04 |
| 4,136,454 | 1/1979 | Jenkins et al. | 33/501.04 |
| 4,468,860 | 9/1984 | Rodengen | 33/784 |
| 4,480,412 | 11/1984 | Shank et al. | 33/784 |
| 4,974,327 | 12/1990 | Greenslade | 33/783 |

FOREIGN PATENT DOCUMENTS

| | | | |
|---|---|---|---|
| 2713224 | 10/1978 | Fed. Rep. of Germany. | |
| 0878607 | 1/1943 | France | 33/807 |
| 2555307 | 5/1985 | France. | |
| 0269005 | 10/1989 | Japan | 33/555.1 |
| 127930 | 8/1969 | Netherlands. | |
| 0265555 | 6/1927 | United Kingdom | 33/808 |

Primary Examiner—William A. Cuchlinski, Jr.
Assistant Examiner—Alvin Wirthlin
Attorney, Agent, or Firm—Griffin, Butler, Whisenhunt & Kurtossy

[57] ABSTRACT

This invention relates to an apparatus for grading flowers on the basis of the thickness of the stem, wherein each flower stem is passed between a rotatable roller and a restraint. One of these two members is arranged for movement and is urged towards the other member under the influence of a force. The displacement of the rotatable roller resulting from the passage of the flower stem is a measure for the thickness of the stem. The rotatable roller is driven at a peripheral velocity which is approximately equal to the speed of the passing flowers.

9 Claims, 3 Drawing Sheets

APPARATUS FOR MEASURING THE THICKNESS OF FLOWER STEMS

Various factors play a role in determining the quality of cut flowers. One quality factor is the length of the stem, which can be measured as described in applicant's Netherlands patent application 90.00731. Another important quality factor is the thickness of the stem, which has been found to be dependent on the amount of sun that the plant has received during its growing period.

BACKGROUND OF THE INVENTION

U.S Patent No. 2,885,787 discloses a method of measuring thickness in an apparatus for grading objects such as boards and the like on the basis of thickness. In this known apparatus, each board can be passed between a rotatable roller and a restraint. One of these two members is arranged for movement and is urged towards the other member under the influence of a force. The displacement of the rotatable roller resulting from the passage, of the board is a measure for the thickness of the board. Their known measuring method referred to above provides a grading according to class of thickness. In the present invention, the drive of the rotatable roller prevents the object to be measured from being damaged and from losing its straight orientation.

A further factor which determines the quality of the flower is the straightness of the stem.

BRIEF DESCRIPTION OF THE INVENTION

The present invention particularly relates to an apparatus for grading flowers on the basis of the thickness of the stem, and is characterized in that each flower stem is passed between a rotatable roller and a restraint, one of these two members being arranged for movement and being urged towards the other member under the influence of a force, the displacement of the movable member resulting from the passage of a flower stem being a measure for the thickness of the stem, while further the rotatable roller is driven at a peripheral velocity which is approximately equal to the speed of the passing flowers.

Eminent processing by this thickness measuring apparatus is obtained when the restraint is also a rotatable roller. This restraining roller may also be driven at a peripheral velocity which is approximately equal to the speed of the passing flowers.

Preferably, both rollers are driven at the speed of the passing flowers.

In further elaboration of the invention, the movable element of the measuring apparatus can comprise a lever having a pivot point, which lever is urged towards the restraint by spring force.

The measurement of the displacement of the lever, and hence of the thickness of the stem, can for instance be effected by means of a proximity switch generating an output signal that is dependent on the displacement of the lever relative to its zero position.

The displacement referred to can also be measured by means of an encoder arranged adjacent the pivot point of the lever.

To achieve optimum prevention of damage to the stems, the rotatable roller or rollers may be coated with a material having a relatively high coefficient of friction, so that no slip can occur between the flower stem and the roller or rollers.

By arranging a plurality of such apparatuses for measuring stem thickness above each other at intervals that correspond with the desired grading length ranges, it is also possible to use the present measuring apparatus for measuring the length of the flowers to be graded.

By relating to each other the times at which each stem passes the different measuring systems arranged above each other, it is also possible to determine the straightness of a stem, which is of course another important factor in determining the quality of the flower.

BRIEF DESCRIPTION OF THE DRAWINGS

To clarify the invention, embodiments of the apparatus for measuring the thickness of a stem will now be described, with reference to the accompanying drawings, in which.

DETAILED DESCRIPTION OF EMBODIMENTS OF THE INVENTION

Figure 1:
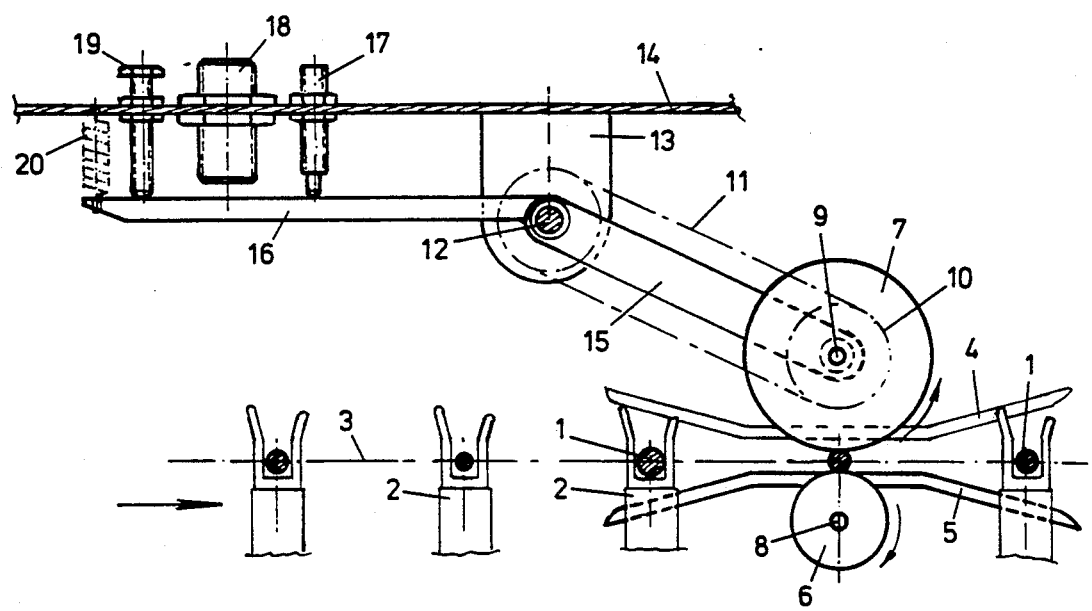
FIG. 1 is a diagrammatic top plan view of an apparatus for measuring the thickness of the stem of a flower.
Figure 2:
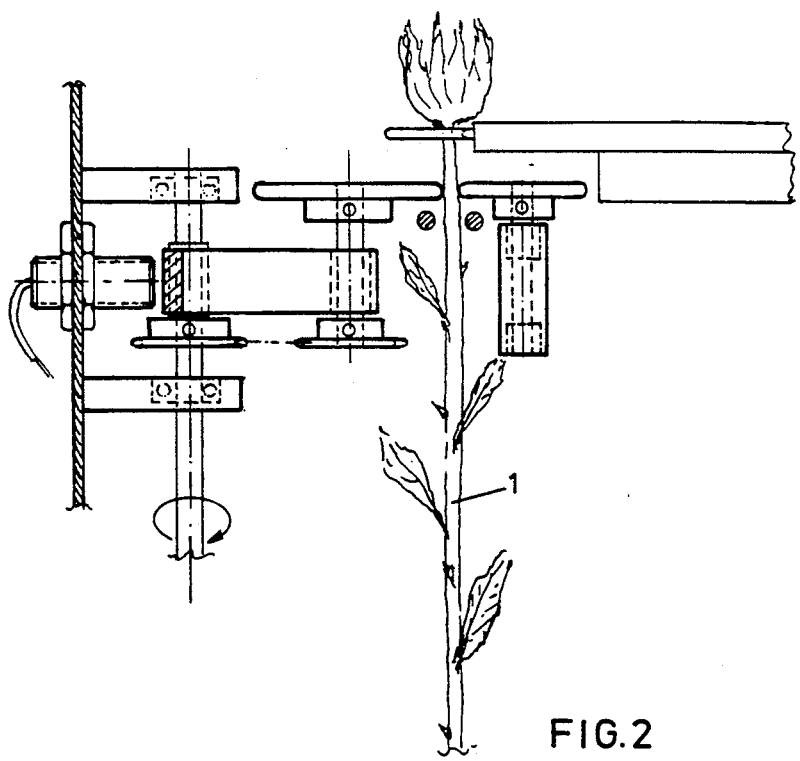
FIG. 2 is a side elevation of the apparatus of FIG. 1.

Referring to the drawings, and specifically referring to FIGS. 1 and 2, there is shown an apparatus for measuring the thickness of the stem of a flower 1, comprising forks 2 which are part of a diagrammatically shown endless conveyor 3, as is disclosed in Netherlands patent application 90.00731, referred to above.

Arranged adjacent the guideways 4 and 5 for the flower stems 1 conveyed by the conveyor 3 is a fixed roller 6 mounted for rotation about a shaft 8, and arranged diametrically opposite roller 6 is a roller 7 mounted for rotation about a shaft 9. Rollers 6 and 7 are both coated with a material, not further specified, having a relatively high coefficient of friction, to ensure that the flowers are not damaged, i.e., no slip should occur between the flower stem and either of the rollers.

Mounted on shaft 9 is a chain wheel 10 which is driven via a chain 11 by a chain wheel mounted on shaft 12 between bearing blocks 13 rigidly secured to a frame 14.

The shafts 9 and 12 are further interconnected by means of a lever 15 which is rigidly connected to a lever 16. The lever 16, which extends substantially parallel to the corresponding portion of the frame 14, cooperates with a buffer 17 which is arranged for absorbing shocks during the displacement of the movable roller 7 relative to the fixed rotatable roller 6.

Arranged adjacent the buffer 17 is an induction sensor 18 in the form of, for instance, a proximity switch generating an analog output signal. Arranged adjacent sensor 18 is an adjustment bolt 19 for adjusting the zero position of the measuring apparatus. Arranged adjacent the bolt 19 is a tension spring 20 which is arranged for pulling the lever 16 back into the zero position and is extended each time a flower stem passes between the rollers 6 and 7.

Figure 3:
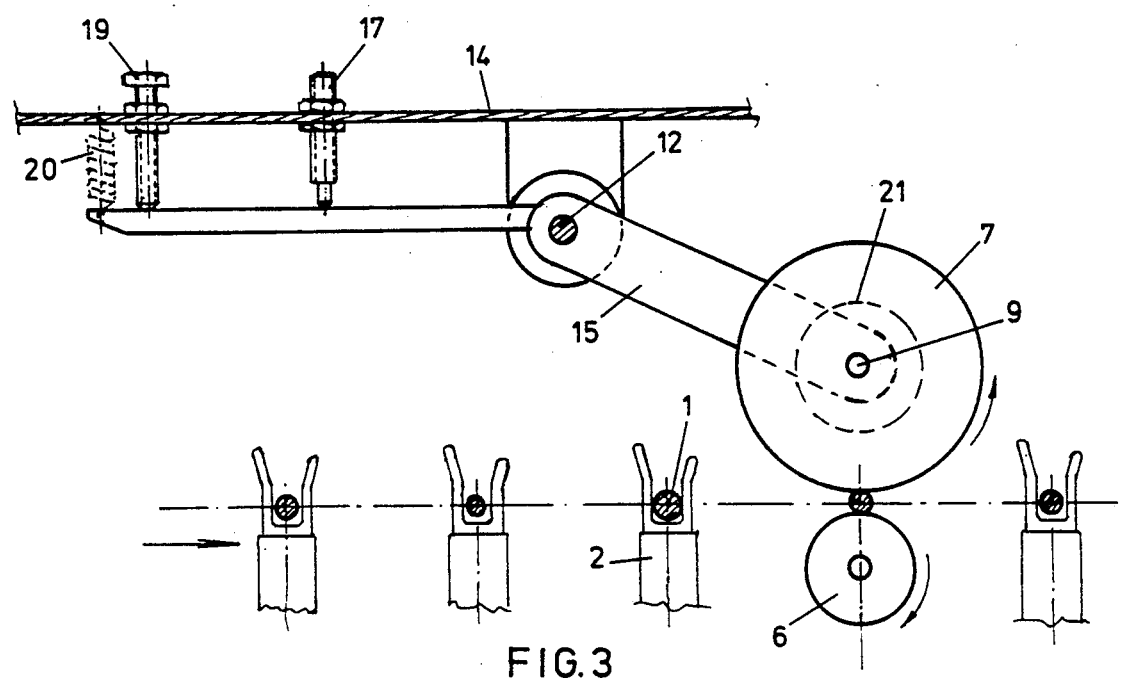
FIG. 3 is a view similar to FIG. 1 of a second embodiment of an apparatus for measuring the thickness of a stem.

As the apparatus shown in FIGS. 3 and 4 largely corresponds to that shown in FIGS. 1 and 2, it will not be described in detail here, but only the modifications to the apparatus of FIG. 1 will be described. These modifications concern the drive of the roller 7, which is effected by means of a servomotor 21 mounted on the shaft 9. The displacement of the roller is measured by means of an encoder which is designated at 22 in FIG. 4. This embodiment, therefore, does not comprise a proximity switch 18 as used in the embodiment according to FIG. 1, but otherwise the apparatuses are similar.

Figure 4:
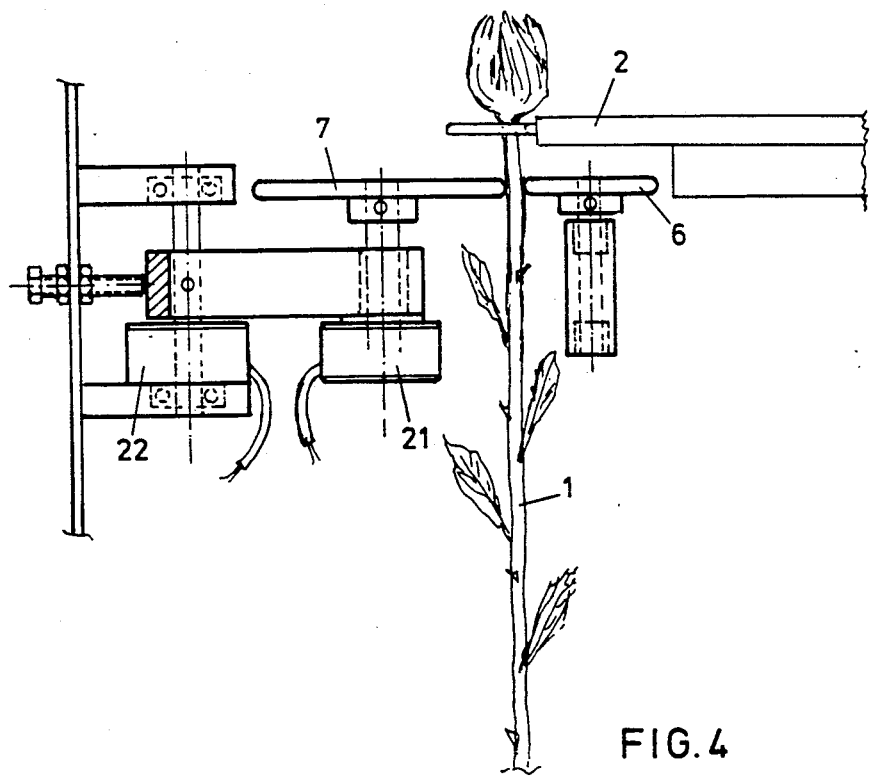
FIG. 4 is a view similar to FIG. 2 of the apparatus of FIG. 3.
Figure 5:
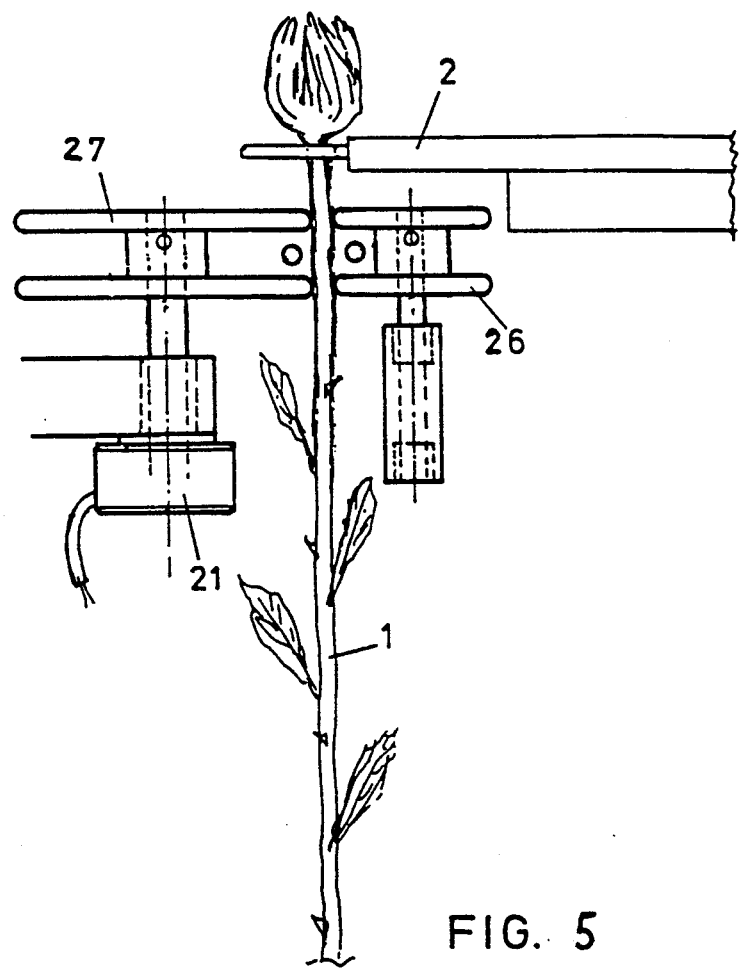
FIG. 5 is a view similar to FIGS. 2 and 4 of a third embodiment according to the invention.

The embodiment shown in FIG. 5 differs from the embodiment shown in FIGS. 2 and 4 in that the rollers 6 and 7 have been replaced by respective pairs of similar rollers 26 and 27 arranged above each other. In this manner, it is ensured that the flowers that are being supplied continue to be suspended in a straight orientation when the stem passes between the rollers. The respective rollers 26 and 27 may be interconnected by means of a hub and mounted on a single shaft in the same manner as in the embodiment of FIGS. 2 and 4. The shaft on which the rollers 27 are mounted can be driven by a single servomotor in the same manner as in the embodiment of FIG. 4.

It will be clear that a great number of modifications are possible without departing from the inventive concept of the invention.

What I claim is:

1. An apparatus for grading the stem thickness of a flower, comprising:
    (1) an endless conveyor having a plurality of flower supporting means for receiving and supporting a vertically disposed single flower;
    (2) a horizontally disposed rotatable restraining roller adapted to rotate about a fixed vertical shaft;
    (3) a horizontally disposed rotatable and displaceable roller supported by a displaceable end of a lever such that a periphery of the displaceable roller is urged towards a periphery of the restraining roller by a spring means and the restraining roller and displaceable roller are positioned relative to the supporting members such that the stem of each flower in each support passes between said rollers;
    (4) drive means for rotating one of said rollers at a peripheral velocity which is approximately equal to a speed of the conveyor; or
    (5) measuring means for measuring a displacement of the displacement roller caused by the passing of a flower stem between the said rollers, whereby the thickness of the flower stem is determined.

2. An apparatus according to claim 1, characterized in that both roller are driven at said velocity.

3. An apparatus according to claim 1, characterized in that the lever has a pivot point.

4. An apparatus according to claim 3, characterized in that the displacement is measured by means of an encoder arranged adjacent the pivot point of the lever.

5. An apparatus according to claim 1 characterized in that the displacement is measured by means of an induction sensor generating an output signal that is dependent on the displacement of the lever relative to its zero position and is a measure for the thickness of the stem.

6. An apparatus according to claim 1, characterized in that one of said rollers is coated with material having a relatively high coefficient of friction.

7. An apparatus according to claim 1, characterized in that a plurality of sets of said rollers are arranged above one another with the rollers of one set being vertically disposed above the rollers of another set at intervals that correspond to a desired flower stem grading length range.

8. An apparatus according to claim 7, characterized in that the time difference at which a stem passes through the rollers at one set arranged above another set is related to the straightness of the stem and the straightness can be derived therefrom.

9. An apparatus according to claim 1, characterized in that the rollers each comprise a double disc.

* * * * *